(12) United States Patent
Rintel et al.

(10) Patent No.: US 12,469,228 B2
(45) Date of Patent: Nov. 11, 2025

(54) MIXED REALITY WORKFLOW GENERATION

(71) Applicant: Microsoft Technology Licensing, LLC, Redmond, WA (US)

(72) Inventors: Edward Sean Lloyd Rintel, Cambridge (GB); Prashant Vaidyanathan, Purley (GB); Paul Kerr Grant, Cambridge (GB); Neil Dalchau, Cambridge (GB); Eyal Ofek, Redmond, WA (US); Payod Panda, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 18/061,271

(22) Filed: Dec. 2, 2022

(65) Prior Publication Data

US 2024/0185534 A1 Jun. 6, 2024

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/017* (2013.01);
(Continued)

(58) Field of Classification Search
None
See application file for complete search history.

(56) References Cited

U.S. PATENT DOCUMENTS 9,122,321 B2  9/2015  Perez et al.
10,055,888 B2  8/2018  Christen
(Continued)

FOREIGN PATENT DOCUMENTS

EP  2973509 B1  9/2019
WO  2021041755 A1  3/2021

OTHER PUBLICATIONS

International Search Report and Written Opinion received for PCT Application No. PCT/US2023/036968, Feb. 20, 2024, 13 pages.
(Continued)

*Primary Examiner* — Sultana M Zalalee
(74) *Attorney, Agent, or Firm* — Alleman Hall & Tuttle LLP

(57) ABSTRACT

A computer-implemented method of generating a mixed reality workflow is described. The method comprises identifying a series of tasks and generating an input task-to-object-mapping by analyzing data that defines a process performed by a first user interacting with objects in a first location. The input task-to-object-mapping that maps each task from the series of tasks to an object used in the respective task. A task-specific non-spatial characteristic of each object in the input task-to-object-mapping is determined and used to map each object in the input task-to-object-mapping to a candidate object identified at a second location to generate an output task-to-object-mapping. The series of tasks, location data defining a position of each candidate object in the second location and output task-to-object-mapping are used to generate a mapped workflow which is then output to a device in the second location.

18 Claims, 6 Drawing Sheets

(51) Int. Cl.
*G06F 3/04842* (2022.01)
*G06Q 10/0631* (2023.01)
*G06T 13/40* (2011.01)
*G06T 13/80* (2011.01)
*G06V 20/20* (2022.01)

(52) U.S. Cl.
CPC ... *G06F 3/04842* (2013.01); *G06Q 10/06316* (2013.01); *G06T 13/40* (2013.01); *G06T 13/80* (2013.01); *G06V 20/20* (2022.01); *G06T 2200/24* (2013.01)

(56) References Cited

U.S. PATENT DOCUMENTS

| | | | |
|---|---|---|---|
| 10,554,921 | B1 | 2/2020 | Lim et al. |
| 10,733,779 | B2 | 8/2020 | Osotio et al. |
| 11,120,639 | B1 | 9/2021 | Smith et al. |
| 2010/0205032 | A1* | 8/2010 | Nielsen ............... G06Q 10/0631 715/702 |
| 2010/0281438 | A1* | 11/2010 | Latta ....................... G06F 3/017 715/863 |
| 2014/0310595 | A1 | 10/2014 | Acharya et al. |
| 2015/0248589 | A1* | 9/2015 | Broache ................. G06F 18/22 382/182 |
| 2017/0169610 | A1 | 6/2017 | King |
| 2017/0316004 | A1 | 11/2017 | Osotio et al. |
| 2017/0351705 | A1 | 12/2017 | Osotio et al. |
| 2018/0181909 | A1* | 6/2018 | Wilkinson .......... G06F 16/7867 |
| 2018/0330293 | A1* | 11/2018 | Kulkarni ............. G06K 7/10366 |
| 2019/0160339 | A1* | 5/2019 | Zhang .................... G06V 40/23 |
| 2019/0303837 | A1* | 10/2019 | Zavesky .......... G06Q 10/06316 |
| 2020/0126661 | A1 | 4/2020 | Flexman et al. |
| 2021/0019215 | A1* | 1/2021 | Neeter ............. G06Q 10/06316 |
| 2021/0192413 | A1* | 6/2021 | Shirazipour ..... G06Q 10/06311 |
| 2022/0223268 | A1* | 7/2022 | Masson .................. G16H 40/67 |

OTHER PUBLICATIONS

"Augmented Reality is Changing Field Service Management", Retrieved From: https://www.servicenow.com/workflow/it-transformation/field-service-management-augmented-reality/, Mar. 4, 2021, 4 Pages.

"Dynamics 365 Mixed Reality: Author in 3D with Holograms", Retrieved From: https://www.youtube.com/watch?v=hjlskKbglCc&list=PLcakwuelHoT8zE8bnSTWdSrpXWkMjLmYL, Nov. 30, 2022, 2 Pages.

"Dynamics 365 Mixed Reality: Customize your workflow", Retrieved From: https://www.youtube.com/watch?v=icN-NdZIY9E, Nov. 30, 2022, 2 Pages.

"Introducing Dynamics 365 Guides and Azure Object Anchors", Retrieved From: https://www.youtube.com/watch?v=BXhMFjGFbTQ&list=PLcakwuelHoT8zE8bnSTWdSrpXWkMjLmYL&index=13, Nov. 30, 2022, 2 Pages.

"Mixed Reality", Retrieved From: https://azure.microsoft.com/en-us/products/category/mixed-reality, Retrieved Date: Nov. 30, 2022, 2 Pages.

"Mixed Reality Capture Tool on Meta Quest 2", Retrieved From: https://www.meta.com/help/quest/articles/in-vr-experiences/social-features-and-sharing/quest-2-mixed-reality-capture/?utm_source=developer.oculus.com&utm_medium=oculusredirect, Retrieved Date: Nov. 30, 2022, 7 Pages.

"Object Anchors", Retrieved From: https://web.archive.org/web/20221007093716/https://azure.microsoft.com/en-us/products/object-anchors/#overview, Oct. 7, 2022, 11 Pages.

"The New Augmented Reality Workflow", Retrieved From: https://www.preview.klaasnienhuis.nl/the-new-augmented-reality-workflow/, Jan. 27, 2014, 9 Pages.

"Upskill is now TeamViewer", Retrieved From: https://web.archive.org/web/20221127043926/https://www.teamviewer.com/en/upskill/, Nov. 27, 2022, 6 Pages.

"Visual Assistance for the Industry", Retrieved From: http://augmented-workflow.com/en/home/, Retrieved Date: Nov. 30, 2022, 5 Pages.

Bhadaniya, et al., "Mixed Reality-Based Dataset Generation for Learning-Based Scan-to-BIM", In Proceedings of the International Conference on Pattern Recognition, Jan. 10, 2021, pp. 389-403.

Darrow, Barb, "Microsoft HoloLens Could Aid Space Station Maintenance and Repairs", Retrieved From: https://fortune.com/2017/05/01/microsoft-hololens-space-station-repairs/, May 1, 2017, 8 Pages.

Finnsinclair, "Building Volumetric UI with MRTK3", Retrieved From: https://techcommunity.microsoft.com/t5/mixed-reality-blog/building-volumetric-ui-with-mrtk3/ba-p/3631764, Sep. 20, 2022, 15 Pages.

Wei, et al., "Mixed Reality Capture on Quest: Workflow, Integrations + Insights", Retrieved From: https://developer.oculus.com/blog/mixed-reality-capture-on-quest-workflow-integrations-insights/, Dec. 14, 2019, 6 Pages.

Wake, et al., "A Workflow to Generate Patient-Specific Three-Dimensional Augmented Reality Models from Medical maging Data and Example Applications in Urologic Oncology", Retrieved From: https://www.ncbi.nlm.nih.gov/pmc/articles/PMC8554989/, Oct. 28, 2021, 11 Pages.

Immerman, David, "How Augmented Reality Bridges the Gap Between Humans and Machines", Retrieved From: https://www.ptc.com/en/blogs/corporate/augmented-reality-bridges-humans, Jul. 8, 2019, 8 Pages.

Juan, "The UX Workflow for Hololens & Mixed Reality", Retrieved From: https://medium.com/hackernoon/the-ux-workflow-for-hololens-mixed-reality-3bf59192e577, Dec. 2, 2016, 10 Pages.

Smith, Dunawayh., "Augmented Reality Workflow & Best Practices", Retrieved From: https://helpx.adobe.com/ca/aero/how-to/augmented-reality-workflows-best-practices-aero.html, Nov. 10, 2022, 10 Pages.

Kent, et al., "Mixed Reality Prototyping: Synchronicity and its Impact on a Design Workflow", In Proceedings of the International Conference on Engineering Design, Aug. 16, 2021, pp. 2117-2126.

Kerawala, et al., "Thinking differently for Mixed Reality", Retrieved From: https://learn.microsoft.com/en-us/windows/mixed-reality/discover/case-study-expanding-the-design-process-for-mixed-reality, Nov. 3, 2022, 10 Pages.

Kiowsow, Brooklyn, "How 3 Industries Are Using Augmented Reality to Streamline Workflow", Retrieved From: https://www.thomasnet.com/insights/how-3-industries-are-using-augmented-reality-to-streamline-workflow/, Feb. 1, 2022, 5 Pages.

Lee, et al., "Design to Fabrication Workflow in Mixed Reality", Retrieved From: https://tigerprints.clemson.edu/caav/Schedule/industry/4/, Oct. 15, 2020, 2 Pages.

Seiger, et al., "Workflow-based Setup of Smart Devices in Mixed Reality", In Proceedings of the 9th International Conference on the Internet of Things, Oct. 22, 2019, 4 Pages.

Silva, et al., "Using Augmented Reality in Different BIM Workflows", Retrieved From: https://www.intechopen.com/chapters/77894, Aug. 5, 2021, 20 Pages.

Sauer, et al., "Mixed Reality in Visceral Surgery: Development of a Suitable Workflow and Evaluation of Intraoperative Use-cases", In Journal of Annals of Surgery, vol. 266, Issue 5, Nov. 1, 2017, 7 Pages.

\* cited by examiner

MIXED REALITY WORKFLOW GENERATION

BACKGROUND

The use of head-mounted displays (HMDs) and mixed-reality (MR) applications is becoming more prevalent in industrial applications to assist with process instructions or troubleshooting. Mixed reality blends the physical (e.g. actual process equipment) with the digital. A user (e.g. a process operator or repair engineer) who is wearing an HMD and looking at a piece of equipment can be presented with prompts in the digital space which are overlaid in the user's field of view so that they appear on or near the piece of equipment.

The embodiments described below are not limited to implementations which solve any or all of the disadvantages of known methods of generating mixed reality workflows.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computer-implemented method of generating a mixed reality workflow is described. The method comprises identifying a series of tasks and generating an input task-to-object-mapping by analyzing data that defines a process performed by a first user interacting with objects in a first location. The input task-to-object-mapping that maps each task from the series of tasks to an object used in the respective task. A task-specific non-spatial characteristic of each object in the input task-to-object-mapping is determined and used to map each object in the input task-to-object-mapping to a candidate object identified at a second location to generate an output task-to-object-mapping. The series of tasks, location data defining a position of each candidate object in the second location and output task-to-object-mapping are used to generate a mapped workflow which is then output to a device in the second location.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
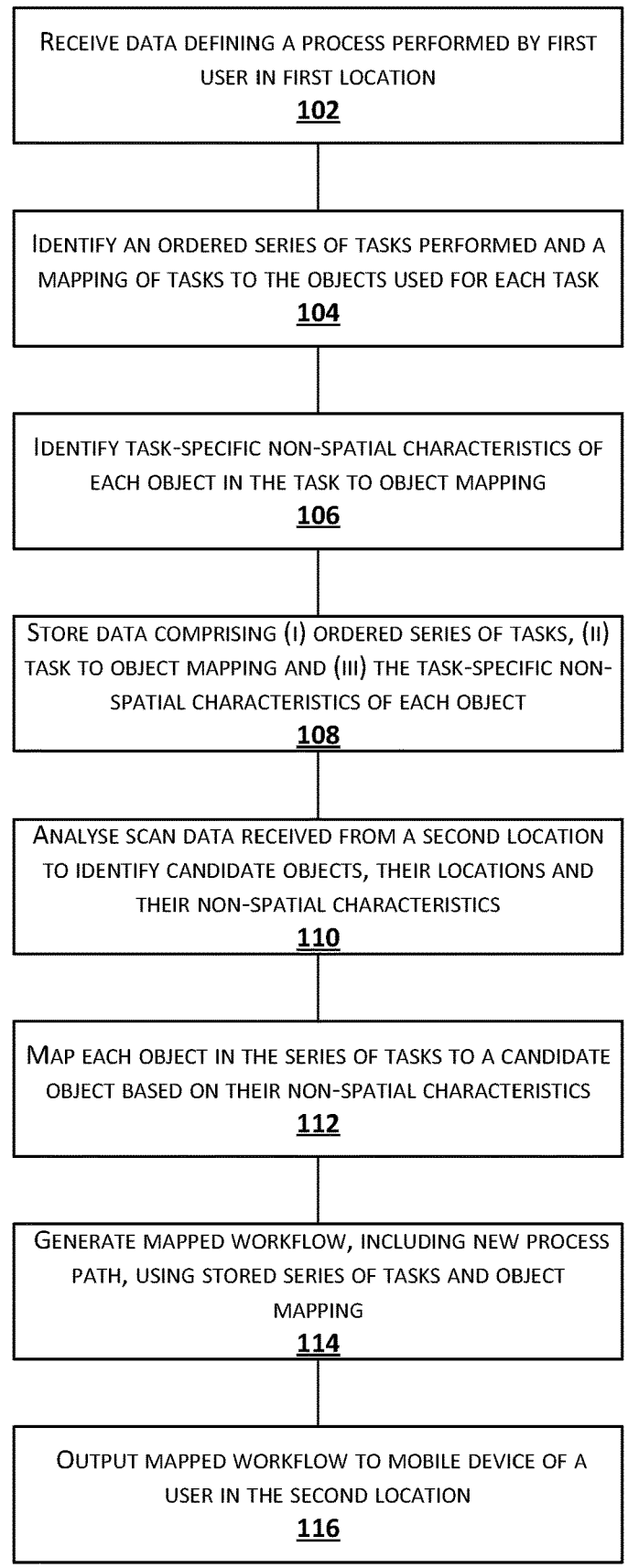
FIG. 1 is a flow diagram of a first example method of generating a MR workflow.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As described above, the use of HMDs and MR applications is becoming more prevalent in industrial applications to assist with process instructions or troubleshooting. In order to provide the overlaid text and images to a user, a MR workflow is created in the form of a sequence of operations and corresponding digital prompts and the user may either step through these manually or the MR application that is presenting the workflow may detect that a step has been completed (e.g. by tracking a user's hand position) and automatically move onto the next step and present the corresponding digital overlay. Depending upon how it is implemented, the digital overlay may be aligned with physical features of objects within the user's field of view (e.g. an arrow indicating a button on a machine that needs to be pressed).

The MR workflows may be generated by defining a flow chart of the actions to be performed and then for each action, combining images of the objects (e.g. equipment) captured in situ (i.e. captured in the same environment where the MR workflow will be used) and digital prompts and annotations. This is a manual process which can take a considerable amount of time and needs to be repeated (in whole or in part) if there is a change in one of the actions (e.g. because a part that is being manipulated changes in some way, or equipment used is upgraded and so has a different UI).

Described herein is a method of generating and executing MR workflows that can be dynamically applied to different locations and/or arrangements of equipment. As described in more detail below, the method comprises capturing a MR workflow in a first location by a first user performing a process. The captured workflow comprises a linked and ordered series of tasks performed by the first user in the captured process (where a task may also be referred to as a process step) and a mapping of the tasks (in the series of tasks) to objects that are used to perform each task (e.g. a centrifuge or its power button, a test tube, a workbench, etc.). This mapping may be referred to as a task-to-object-mapping or a task to object dependency map. A data structure (e.g. a database) is created that defines each of the objects in terms of task-specific characteristics which are also non-spatial characteristics. Where the same object is used for multiple tasks in the series of tasks, separate entries may be created for the object in the data structure, e.g. where the task-specific characteristics differ between the tasks. Alternatively, there may be multiple sub-entries for an object, each sub-entry defining the task-specific characteristics of the object for a particular task. The term 'non-spatial characteristics' is used herein to distinguish the characteristics from spatial characteristics which define the physical location (or position) of the objects in terms of coordinates (e.g. Cartesian coordinates, GPS, grid reference, etc.) or with reference to other objects (e.g. in terms of a distance between objects).

The task-specific non-spatial characteristics that define an object comprise capabilities of the object that are used (i.e. are relied upon) when performing the particular task and may also comprise environmental constraints associated with the object that are required in order to perform the task. For example, an object that corresponds to an area of workbench (e.g. for performing a chemical handling task) may have an environmental constraint that defines lighting requirements (e.g. in terms of a minimum brightness measured in lumens) and/or that defines that the workbench is free of obstacles. Other examples of environmental constraints include airflow or ventilation requirements. The task-specific non-spatial characteristics may also be referred to as 'task-specific properties', 'task-specific characteristics' or 'task-specific capabilities' of an object.

The MR workflow is executed in a second location so that a second user, wearing a HMD and viewing the MR workflow (or otherwise viewing the MR workflow on any mobile device), can follow and perform the same process (i.e. the same series of tasks) as the first user performed when capturing the MR workflow. Prior to execution of the MR workflow in the second location (where the second location is different from the first location), the task-specific non-spatial characteristics are used to map each object used by the first user in the first location (i.e. each object in the task-to-object-mapping for the process) to an object in the second location with corresponding non-spatial characteristics.

By using non-spatial characteristics to map a workflow captured in a first location to objects identified within a second location, rather than spatial constraints, the two locations do not need to be identical in their layout. Furthermore, a workflow that is captured in a first location can be independently mapped, based on the non-spatial characteristics, to a plurality of different locations (each one having a different layout) without needing to perform any recapture of the process. The mapping based on non-spatial characteristics enables a process that is captured in a first location to be mapped to a second location which has security and/or safety restrictions that do not permit access by the first (recording) user (e.g. such that the first user could not record the process in the first location). By using non-spatial constraints rather than object identifiers to perform the mapping, the objects provided in the two locations also do not need to be identical.

The use of non-spatial constraints rather than object identifiers to perform the mapping, may also result in a mapped workflow that is shortened in terms of time or otherwise is more efficient (e.g. because it uses fewer pieces of equipment) because the mapping can take advantage of different objects (e.g. equipment) that are available in the second location (e.g. which is more capable than the equipment in the first location) or where there is more than one suitable object (e.g. piece of equipment), the mapping can select object in the second location that optimizes (e.g. shortens) the process path.

FIG. 1 is a flow diagram of an example method of generating a MR workflow. As shown in FIG. 1, data that defines (e.g. captures) a process that is performed by a first user in a first location is received (block 102). The capturing process (that generates the data received in block 102) may comprise capturing (e.g. recording) a video stream of the process being performed by the first user. The video stream may be captured using a camera in a HMD worn by the first user. In another example, the video stream may be captured using a camera in a body-worn device or hand-held device held by the first user (e.g. a mobile phone or tablet computing device in a harness worn by the user or held in the user's hand). In other examples, the camera may not be worn or carried by the first user but may instead be located in the first location (e.g. in a corner, on the ceiling, etc.) such that the entire process is within the field of view of the camera (which may be fixed or may be movable such that can track the motion of the first user). The video stream may capture both the objects handled by the first user as part of the process and hand movements or gestures made by the user. The video stream may also capture speech of the first user and this speech may subsequently provide audio or text-based instructions linked to process steps. Additional data may also be captured alongside the video stream, e.g. depth data, where a depth camera is used in parallel with an RGB camera. Further examples of additional data that may also be captured alongside the video stream includes other signals such as infra-red or ultra-violet, radio beacons (such as NFC, UWB) and any other signals used to connect to, or communicate with, devices.

Whilst the process is described above as being captured in the form of a video stream, in other examples the process may be captured in other forms. For example, the process may be captured in a series of still images. In another example, the process may be captured in a flow diagram (e.g. as created by the user) along with a series of images or a video of the first location.

Having received the data that defines the process (in block 102, e.g. in the form of a video stream), the captured data is analyzed to identify a series of tasks performed by the first user and a plurality of objects used for each task and generate a task-to-object-mapping (block 104). The tasks performed may be identified using video analysis (e.g. including gesture recognition) or may be inferred based on the object identification (e.g. there may be one or more pre-defined tasks associated with each object). The objects may be identified from the captured process using object recognition (e.g. using image processing techniques on the video stream) and/or tracker markers (e.g. identification of markers, such as QR codes or fiducial markers, placed on objects in the first location). Machine learning may be used to perform the task and/or object recognition.

Having identified (in block 104) the tasks and objects used in the captured process and generated the task-to-object-mapping, one or more task-specific non-spatial characteristics associated with each object are identified (block 106). As described above, a task-specific non-spatial characteristic of an object is a characteristic that defines a capability of the object that is used when performing the particular task or an environmental constraint associated with object when performing the particular task. The task-specific non-spatial characteristics do not include the location of the object or its relative position within the first location where the capture is performed. The non-spatial characteristics for an object may be pre-defined based on a combination of the identified object and the task to which it is mapped (e.g. using a look up in a database of non-spatial characteristics based on an object identifier, with the returned characteristics filtered based on a task identifier to remote any non-task-specific non-spatial characteristics and leave only those non-spatial characteristics that are related to the task) or may be defined in another way. For example they may be accessed from resources provided by the equipment manufacturer (e.g. via their website), digital laboratory notebooks, online databases, or other online resources (e.g. extracted from methods sections or appendices of research reports or articles) using an object identifier and/or task identifier.

The data for the captured process is then stored (block 108), e.g. in the form of a data structure. This data comprises the ordered series of tasks (as identified in block 104) which define a process flow, the task-to-object-mapping (as identified in block 104) and the task-specific non-spatial characteristics of each object in the task-to-object-mapping (as identified in block 106). The stored data structure provides a compact, location independent, representation of the captured process.

The spatial characteristics of the objects may be determined from the captured video stream and these may be used when identifying tasks and/or objects (in block 104). The spatial characteristics of the objects may also be stored alongside the non-spatial characteristics (in block 108); however, as described below, the spatial characteristics are not used subsequently when performing the mapping to the second location.

The subsequent stages in the method of FIG. 1 (blocks 110-116) relate to the generation of a MR workflow from the stored data structure. As described above, this MR workflow is mapped to a second location that is different from the first location (blocks 110-114) and then output to a device in the second location. This device may be a mobile device held or worn by a second user (e.g. a HMD worn by the second user) in the second location (block 116). The mapping (in block 110-114) may be performed in response to a request received from the second user in the second location and may be performed in real-time (e.g. at the time the second user performs the process).

The differences between the first and second locations may be in terms of the layout of objects (e.g. equipment used as part of the captured process) as well as the nature and/or capabilities of the objects at the different locations (e.g. the second location may have different equipment to that used to capture the process at the first location). The methods described herein enable the second user to emulate the process performed by the first user in the first location even though the configuration and available equipment may be different at the second location.

Figure 2:
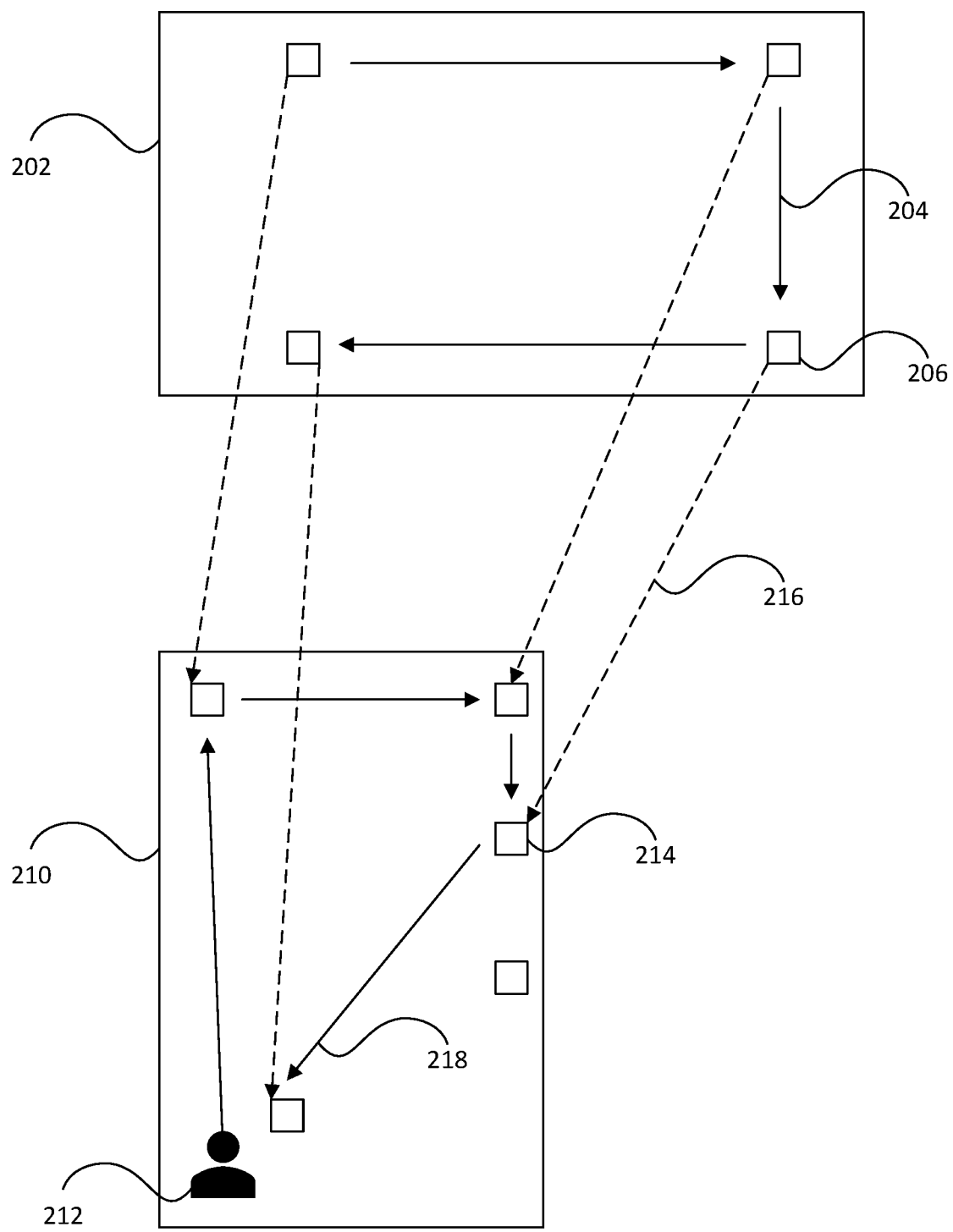
FIG. 2 is a schematic diagram showing example plan views of a first location where a process has been captured and a second location where the captured process is to be performed.

The mapping process, which can be described with reference to FIG. 2, involves analyzing data generated by scanning the second location (and hence received from the second location) to identify candidate objects, their locations (i.e. the position of each candidate object within the second location) and their non-spatial characteristics (i.e. one or more non-spatial characteristics of each candidate object) (block 110). The data generated by scanning the second location may be referred to as scan data. FIG. 2 is a schematic diagram showing example plan views of a first location 202 where a process (as indicated by arrows 204 and using objects 206) has been captured and a second location 210 where the captured process is to be performed. The scanning of the second location 210 may be performed using a camera in the mobile device held or worn by the second user 212 (e.g. using a camera in a HMD worn by the second user 212) in the second location and object recognition may be performed on the video feed captured by the camera, in an analogous method to that described above for the capture process and subsequent processing (in blocks 102-104). The locations of each candidate object 214 may be determined using sensors within the mobile device (which may be a HMD) such as GPS, accelerometers and/or cameras (RGB and/or depth cameras). In various examples Simultaneous Location and Mapping (SLAM) techniques may be used.

The non-spatial characteristics of each candidate object may be determined in an analogous method to that described above for the capture process (in block 106); however, the non-spatial characteristics of the candidate objects are not limited to those related to a specific task (i.e. they are not task-specific unlike those determined as part of the capture process). These non-spatial characteristics of a candidate object may also be referred to as process capabilities of a candidate object as they define the all the process related characteristics of the candidate object (i.e. for all processes that the candidate object is capable of performing rather than being specific to a particular task). As described above, the non-spatial characteristics of a candidate object may be accessed from resources provided by the equipment manufacturer (e.g. via their website), digital laboratory notebooks, online databases, or other online resources (e.g. extracted from methods sections or appendices of research reports or articles), e.g. based on an object identifier. Unlike in the capture process, the accessed characteristics are not filtered based on a task identifier.

The scanning process (that generates the data received and analyzed in block 110) may require the second user 212 to move around the second location so that all parts of the second location have been scanned.

Having identified a plurality of candidate objects 214, the task-specific non-spatial characteristics of the objects in the stored task-to-object-mapping (from block 108) and the non-spatial characteristics of the identified candidate objects are used to map each object in the stored task-to-object-mapping (which may alternatively be referred to as the input task-to-object-mapping) to a candidate object (block 112), as indicated by the dotted arrows 216 in FIG. 2.

Each object in the task-to-object-mapping is mapped (in block 112) to a candidate object with corresponding (e.g. overlapping) non-spatial characteristics, i.e. a first object from the task-to-object-mapping may be mapped to a second object where the task-specific non-spatial characteristics of the first object are a subset of the non-spatial characteristics of the second object. A third object which has non-spatial characteristics that are only a subset of the task-specific non-spatial characteristics of the first object (i.e. they are only partially overlapping hence do not correspond) would not be mapped to the first object. The mapping (in block 112) is performed by comparing the task-specific non-spatial characteristic of an object to the non-spatial characteristic of a candidate object and this may be performed using database queries. The use of non-spatial characteristics to perform this mapping enables mapping of compatible, but non-identical objects and provides additional flexibility when mapping a workflow from one location to another (e.g. compared to using object identifiers which would only enable mapping to identical objects).

This mapping process (in block 112) converts the stored/input task-to-object-mapping to an output task-to-object-mapping by replacing each object in the input task-to-object-mapping by the mapped candidate object (e.g. if a first object in the input task-to-object-mapping is mapped to a first candidate object, the first candidate object replaces in the output task-to-object-mapping).

Where there is more than one candidate object in the second location that has corresponding non-spatial characteristics, other criteria may be used to determine which candidate object is selected and included in the output task-to-object-mapping, such as based on sequencing (e.g. if two tasks overlap in time in the ordered series of tasks, they may always be mapped to different candidate objects), performance metrics (e.g. selecting a candidate object that can perform the task faster or with reduced power consumption, etc.), spatial separation in the second location (e.g. by selecting a candidate object that is physically closer to candidate objects mapped used in the an adjacent task) and/or object clustering (e.g. where a plurality of objects are mapped to a single task, the candidate objects may be selected so that the distance between these objects in the second location is minimized).

In various examples additional constraints may be applied when generating the output task-to-object-mapping (in block 112). For example, constraints relating to the second user may be applied, e.g. so that only pieces of equipment that the second user is trained to use and/or otherwise able to use are included in the output task-to-object-mapping. Such additional constraints may improve the safety of the output mapped workflow. Other examples of constraints that may be used in addition to, or instead of, those described previously, include ergonomic constraints.

The output task-to-object-mapping (from block 112) and the stored ordered series of tasks (from block 108) are then used to generate a mapped workflow (block 114) and the mapped workflow is output to a mobile device used by the second user (e.g. a HMD worn by the second user) in the second location (block 116). The mapped workflow defines (i) a process path (which may also be referred to as a process route), as indicated by the solid arrows 218, around the second location, (ii) the tasks to be performed and (iii) the objects to be used for each task (block 114). The process path is determined using the stored series of tasks (from block 108), the output task-to-object-mapping (from block 112) and the location data, i.e. the positions of the mapped objects within the second location (from block 110). In another example, given a series of tasks T1, T2, T3, performed using mapped objects O1, O2, O3 at locations L1, L2, L3 respectively in the second location (such that the location data defines L1, L2 and L3), the process path comprises waypoints L1 (for the performance of task T1 using object O1), L2 (for the performance of task T2 using object O2) and L3 (for the performance of task T3 using object O3).

Figure 3:
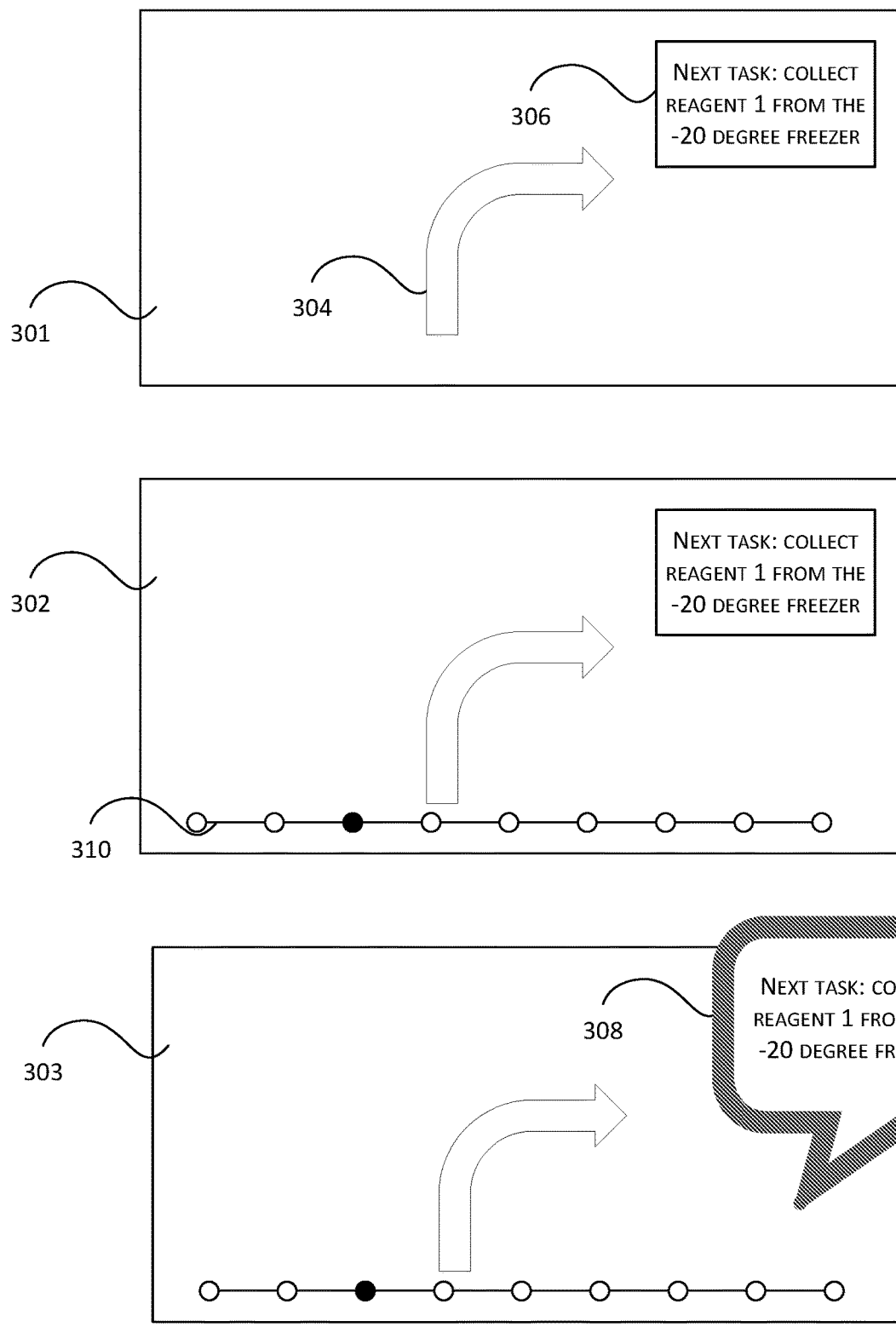
FIG. 3 shows three examples of the mapped workflow as rendered on a mobile device, such as a HMD.

As shown in the examples 301-303 in FIG. 3, the mapped workflow (from block 114) that is rendered on the mobile device held or worn by the second user (e.g. HMD worn by the second user) in the second location (in block 116) comprises UI elements 304 that show the next step in the process path (e.g. in the form of arrows guiding the second user to the position where the next task is to be performed in the second location) and process prompts 306, 308 which identify the next task to be performed which may be in the form of text prompts 306 and/or audible prompts 308.

Where the captured process includes spoken prompts or commands uttered by the first user (and recorded and included in the data received in block 102), these may be stored as audio or text files associated with the corresponding tasks (in block 108) and output as the audio prompts 308 and/or text prompts 306 in the mapped workflow (in block 116). A text-to-speech engine may be used to convert spoken prompts in the captured process to text-based prompts in the mapped workflow.

Where the captured process includes gesture data, captured from the video stream using gesture recognition, this gesture data may be stored associated with the corresponding tasks (in block 108) and output as visual prompts in the mapped workflow (in block 116). The stored gesture data for a task comprises positional data relative to objects in the input task-to-object-mapping for the particular task and the output gesture visual prompts are rendered at the same relative position to the corresponding object in the output task-to-object-mapping. The output gesture visual prompts may take the form of arrows. In other examples, an avatar of the first user may be displayed within the UI rendered on the mobile device (e.g. HMD) of the second user and stored gesture data may be used to animate the limbs of the avatar to recreate the captured gestures at the same relative position to the corresponding object in the output task-to-object-mapping. By animating an avatar and translating the gestures so that a gesture captured in relation to a first task and performed relative to a first object in the input task-to-object-mapping is displayed relative to the corresponding object in the output task-to-object-mapping, the second user can see clearly what actions they need to perform and can easily and accurately replicate them. This avoids potential misunderstanding of text or voice prompts and may be particular important where there are safety considerations (e.g. where the process itself is hazardous if not performed correctly or the second location is a hazardous environment).

As shown in the second and third examples 302, 303 in FIG. 3, the mapped workflow that is rendered may also include a UI element 310 that indicates progress through the series of tasks that form the captured process. In the example shown each task in the series is shown as a circle along a progress line and the next task is shown as a solid circle. It will be appreciated that this may be represented in many different ways.

In some examples the mapped workflow may be generated in its entirety (in block 114) before any of it is output to the mobile device (e.g. HMD) of the second user (in block 116). In other examples, the output may start before the mapped workflow has been fully generated but after generation of the output task-to-object-mapping for at least the first task in the ordered series of tasks.

Whilst not shown in FIG. 1, in various examples there may be feedback between the generation of the mapped workflow (in block 114) and the mapping of objects (in block 112) in order to optimise the output task-to-object-mapping and hence the mapped workflow based on pre-defined criteria. For example, having generated the mapped workflow (in block 114), the length of the process path may be determined and this may be fed back to the mapping with a goal to reduce the length of the process path by adjusting the mapping (i.e. mapping alternative candidate objects for a particular task where there is more than one compatible candidate object). In other examples, different criteria may be used (e.g. one or more of process length, process time or power consumption) and where there is more than one process being mapped to the second location, the optimization may be performed across some or all of the processes, e.g. to collectively optimize the output task-to-object-mappings and hence collectively optimize those processes being mapped.

In various examples, the second location may be divided into micro-environments based on a hierarchy of objects defined for each task within the input task-to-object-mapping (as defined in block 104). In other examples, some but not all tasks may include a hierarchy so only parts of the second location may divided into micro-environments. Where a hierarchy is used for a task, a mapping within the input task-to-object-mapping comprises one or more primary objects and one or more subsidiary objects (e.g. at one or more lower levels in a hierarchy). A primary object may be a main piece of equipment used to perform the task and a subsidiary object may be a tool, consumable or ancillary object used in performing the task with the primary piece of equipment. Where such a hierarchy is defined in the input task-to-object-mapping, it is used when mapping candidate objects (in block 112). The mapping may first map the primary objects in the input task-to-object-mapping and then select candidate objects for the subsidiary objects that have corresponding non-spatial characteristics and which are also physically proximate to the mapped primary object (based on their positions within the second location as determined in block 110). This physical proximity requirement defines the micro-environments and may, for example, be defined as within 1 m of the mapped primary object (e.g. such that each micro-environment has a 1 m radius). Use of an object hierarchy (and hence micro-environments) may reduce the time taken to perform the mapping and result in a more efficient mapped process particularly where a large number of suitable candidate objects exist because it reduces the search space for the subsidiary objects to those within the micro-environment around the mapped primary object.

Figure 4:
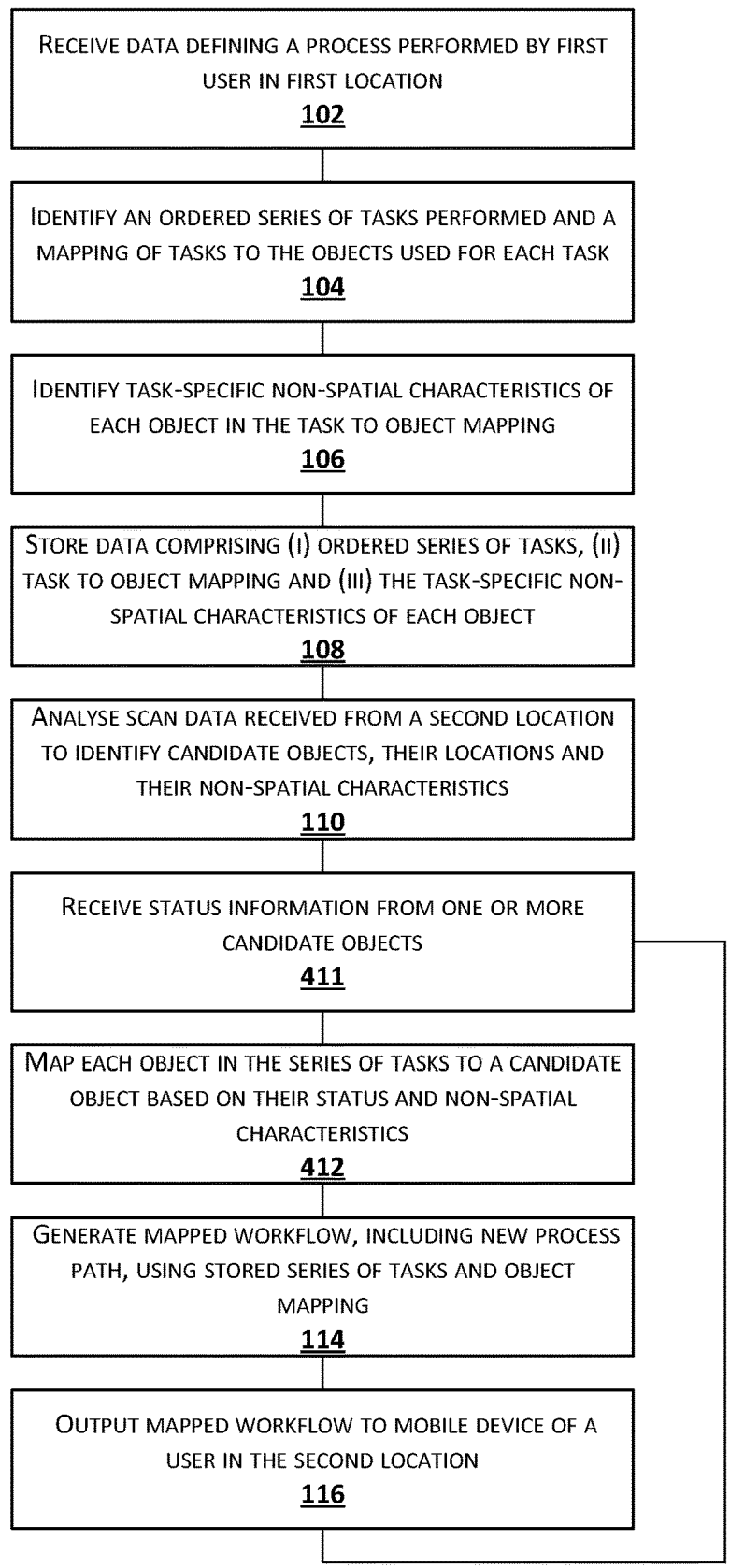
FIG. 4 is a flow diagram of a second example method of generating a MR workflow.

In the method described above with reference to FIG. 1, the non-spatial characteristics of a candidate object in the second location are static and pre-defined and do not change over time. FIG. 4 is a flow diagram of another example method of generating a MR workflow which additionally uses dynamic, real-time, status information when generating the output task-to-object-mapping and hence the mapped workflow. This method may be used where the mapped workflow is generated in real-time, i.e. where it is generated (in block 114) and then output (in block 116) and followed by the second user straight away.

Most of the method blocks in FIG. 4 are the same as those shown in FIG. 1 and described above, however, the method additionally comprises receiving status information from one or more candidate objects (block 411) and using this status data when mapping objects in the series of tasks to candidate objects, i.e. when generating the output task-to-object-mapping (block 412). The status data may be used (in block 412) to filter out any candidate object that is showing as unavailable, e.g. because it is switched off, already being used or not working (i.e. out of order).

Where status data is used, as shown in FIG. 4, the status data may be received once (in block 411) and used to generate the output task-to-object-mapping (in block 412) or the status data may be received a plurality of times (e.g. periodically or substantially continuously) and the original output task-to-object-mapping updated during execution of the process by the second user in the second location (e.g. as indicated by the link from block 116 back to block 411). Where status data is received during execution of the process, the output task-to-object-mapping may only be updated if the updated status information relates to an object that is included in the output task-to-object-mapping for a task that has not yet been started. In other examples, the mapping may be performed periodically based on the updated status data to update the parts of the output task-to-object-mapping that relate to any tasks that have not yet been started. This improves process performance if, for example, a most suitable object for performing a task changes from being unavailable to being available after execution of the process has started (i.e. after the mapped workflow has started to be output in block 116).

Figure 5:
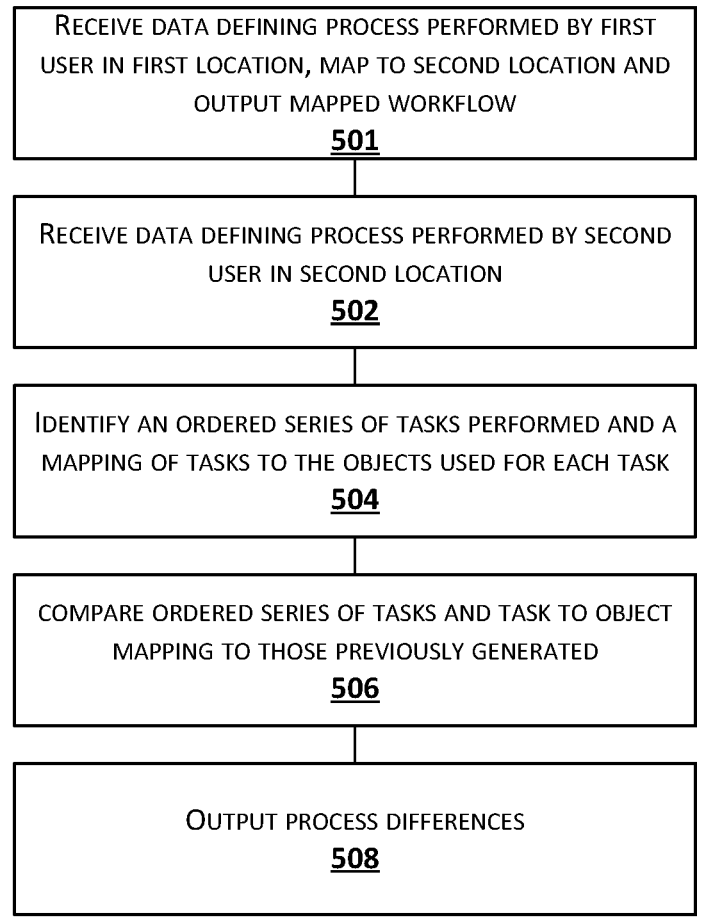
FIG. 5 is a flow diagram of an example method of process comparison which uses a MR workflow generated using the method of FIG. 1 or FIG. 4.

In various examples, the process that is performed at the second location by the second user using the mapped workflow generated using the methods described above (block 501 e.g. as shown in FIG. 1 or 4) may be captured when it is performed (to generate the data received in block 502), as shown in FIG. 5. This process may be captured using the same methods as were used to capture the initial process performed by the first user at the first location (to generate the data received in block 102), as described above. For example, a video stream may be recorded by a mobile device held or worn by the second user (e.g. a HMD worn by the second user). The same techniques as described above (with reference to block 104) may then be used to identify an ordered series of tasks performed by the second user and a mapping of tasks to the objects used for each task (block 504). This mapping of tasks to objects may be referred to as the resultant task-to-object-mapping to distinguish it from the input task-to-object-mapping and the output task-to-object-mapping described above. The ordered series of tasks and resultant task-to-object-mapping (generated in block 504) may then be compared (in block 506) to the previously generated series of tasks and task-to-object-mappings (as generated in block 501) to identify and then output any differences (block 508). Any differences between the series of tasks and between the output task-to-object-mapping and the resultant task-to-object-mapping will indicate that the second user did not follow the output mapped workflow.

Figure 6:
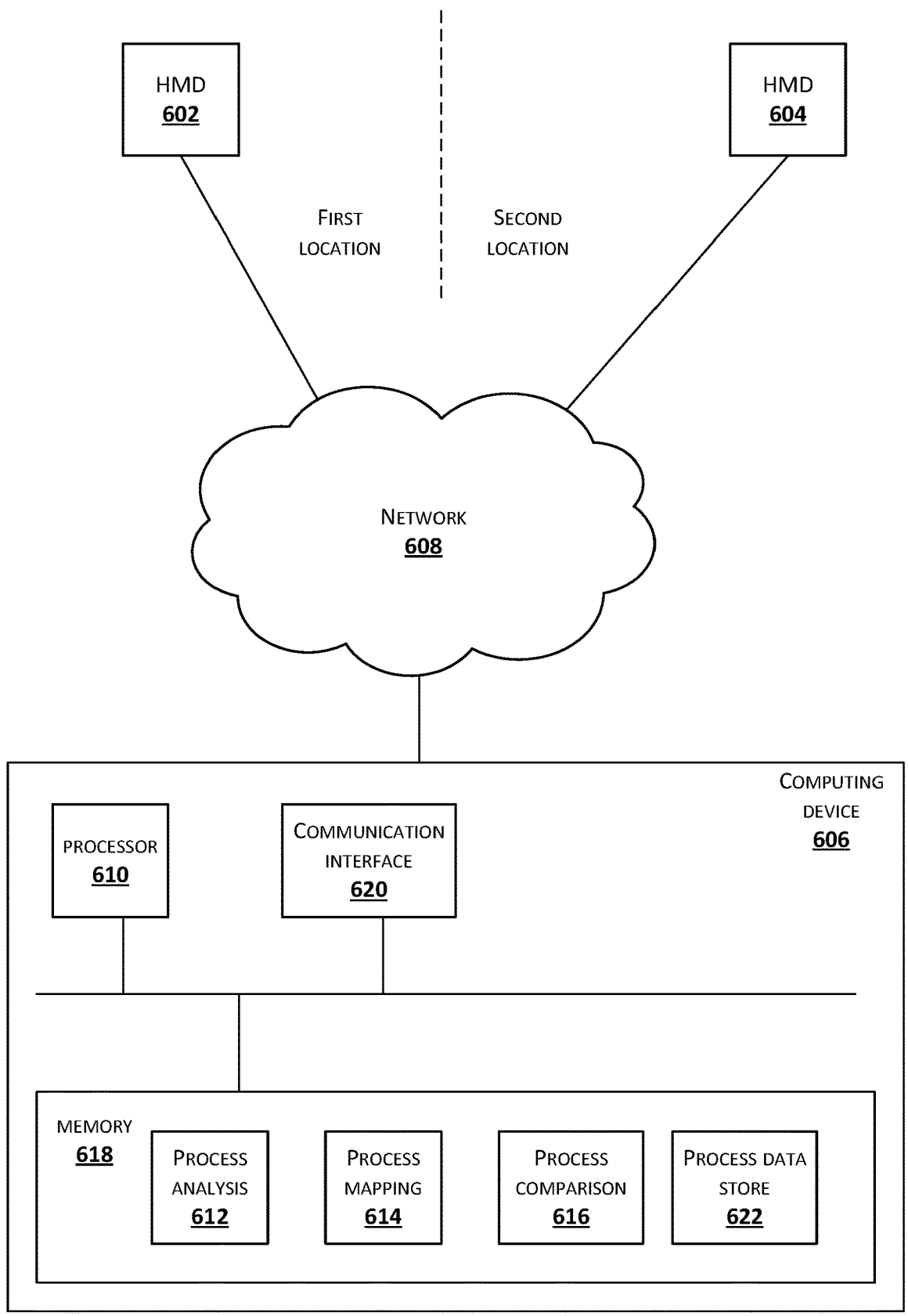
FIG. 6 illustrates an exemplary system in which the methods described herein are implemented.

The methods described above, e.g. with reference to FIGS. 1, 4 and 5 may be performed using the system shown in FIG. 6. The system shown in FIG. 6 comprises a first HMD 602 in the first location and a second HMD 604 in the second location. As described above, the process is captured in the first location and subsequently mapped to the second location and may also be mapped to additional locations. Whilst FIG. 6 shows a first HMD 602 that captures the process performed by the first user (wearing the first HMD 602) in the first location (e.g. to generate the data received in block 102 and 501), as described above, alternative devices may instead be used to capture the process (e.g. any mobile device used by the first user, e.g. worn or held by the first user, or a fixed device in the first location). The second HMD 604 in the second locations receives and renders the mapped workflow to enable a second user, wearing the second HMD 604, to perform the process that was originally captured at the first location. The second HMD 604 may also capture the process performed by the second user (e.g. to generate the data received in block 502). Whilst FIG. 6 shows a second HMD 604 that renders the mapped process and may also capture the process performed by the second user, as described above, alternative devices may instead be used to capture the process (e.g. any mobile device used by the second user, e.g. worn or held by the second user).

In the example shown in FIG. 6, the process capture and process mapping are both performed by the same computing device 606. The first HMD 602 sends the captured process (e.g. in the form of a video stream) to the computing device 606 and the analysis is performed by the computing device. The second HMD 604 sends the scan data for the second location to the computing device 606 and the mapping is performed by the computing device. The computing device 606 generates the mapped workflow and transmits it to the second HMD 604. The second HMD 604 receives and renders the mapped workflow. In FIG. 6 this computing device 606 is connected to the two HMDs 602, 604 via a network 608 and may be located anywhere (e.g. in the first location, second location or a different, third location). In other examples, different blocks of the methods described above may be performed by different computing devices which may be co-located or geographically distributed and some of the method blocks may be performed by the HMDs 602, 604. For example, the first HMD 602 may perform the analysis of the captured process (in blocks 104-108) and/or the second HMD 604 may perform the process mapping (in blocks 110-116, 411, 412).

The computing device 606 comprises one or more processors 610 which are microprocessors, controllers or any other suitable type of processors for processing computer executable instructions to control the operation of the device in order to perform the process capture and mapping as described above. In some examples, for example where a system on a chip architecture is used, the processors 610 include one or more fixed function blocks (also referred to as accelerators) which implement a part of the method of process capture or mapping in hardware (rather than software or firmware). Platform software comprising an operating system or any other suitable platform software may be provided at the computing device to enable application software to be executed on the device. The application software comprises a process analysis module 612, a process mapping module 614 and a process comparison module 616. In examples where the comparison, described above with reference to FIG. 5, is not performed, the process comparison module 616 may be omitted. It will be appreciated that whilst these modules are shown separately in FIG. 6, a single module may instead perform the functionality of two or more of these modules (e.g. a process capture and mapping module).

The process analysis module 612 receives the captured process data (in block 102), e.g. in the form of a video stream received from the first HMD 602, and analyses the received data to identify the ordered series of tasks performed, the input task-to-object-mapping and the task-specific non-spatial characteristics of each object in the input task-to-object-mapping (blocks 104-106) and stores this data (i.e. the data defining the series of tasks, the input task-to-object mapping and a task-specific non-spatial characteristic of each object in the input task-to-object mapping) in memory 618 (block 108), e.g. in a process data store 622.

The process mapping module 614 receives the scan data, e.g. in the form of a video stream received from the second HMD 604, and analyses the scan data to identify the candidate objects, location data (that identifies the position of each candidate object within the second location) and one or more non-spatial characteristics of each candidate object (block 110). The process mapping module 614 accesses the data generated and stored by the process analysis module 612 (e.g. accesses the data from the process data store 622) and performs the process mapping (blocks 112-114 or blocks 411, 412 and 114). The process mapping module 614 also outputs the mapped workflow to the second HMD 604 via the communication interface 620 (block 116).

The process comparison module 616 receives the captured process data (as generated by the second HMD 604 and received in block 502 and which may, for example, comprise a captured video stream), identifies the ordered series of tasks performed and the resultant input task-to-object-mapping by analyzing the captured process data (block 504), performs the comparisons (in block 506) and outputs the process differences (block 508). This difference data may, in some examples, be stored in the process data store 622.

Alternatively, or in addition, the functionality of any of the modules 612-616, 622 described herein may be performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The computer executable instructions, including the application software 612-616, are provided using any computer-readable media that is accessible by the computing device 606. Computer-readable media includes, for example, computer storage media such as memory 618 and communications media. Computer storage media, such as memory 618, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 618) is shown within the computing device 606 it will be appreciated that the storage is, in some examples, distributed or located remotely and accessed via a network or other communication link (e.g. using communication interface 620).

As shown in FIG. 6, the memory 618 may also comprise a process data store 622 configured to store the ordered series of tasks, input task-to-object-mapping and the task-specific non-spatial characteristics of each object in the input task-to-object-mapping (as generated in blocks 108 and 501).

Where status data is used, the communication interface 620 receives the status information from the second location (in block 411).

Although not shown in FIG. 6, the computing device 606 may also comprises an input/output controller arranged to output display information to a display device which may be separate from or integral to the computing device 606. The display information may provide a graphical user interface, e.g. to display the differences in processes output in block 508 of FIG. 5. The input/output controller, where provided, is also arranged to receive and process input from one or more devices, such as a user input device (e.g. a mouse, keyboard, camera, microphone or other sensor). In some examples the user input device detects voice input, user gestures or other user actions and provides a natural user interface (NUI). In an embodiment the display device also acts as the user input device if it is a touch sensitive display device. The input/output controller may also output data to devices other than the display device in some examples, e.g. a locally connected printing device.

The HMDs 602, 604 and any of the input/output controller, display device and the user input device (where included in the computing device 606) may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although the present examples are described and illustrated herein as being implemented in the system shown in FIG. 6, the system described is provided as an example and not a limitation. As those skilled in the art will appreciate, the present examples are suitable for application in a variety of different types of computing systems and as described above, the functionality of the computing device 606 may be spread between multiple computing devices which may include either or both HMDs 602, 604. Furthermore, as described above, the HMDs 602, 604 may instead be other types of mobile devices (e.g. smart phones, tablets, etc.).

The systems and methods described herein may be used in many different scenarios, e.g. for many different processes, and an example use case is described below. It will be appreciated that this is by way of example only and the methods described herein may be used for any type of process including manufacturing processes, chemical or biological processes, etc.

In this example use case, the process that is captured is bacteria DNA extraction and is captured at the first location. The process performed comprises the following tasks:

Task 1: add lysis buffer [Reagent 1] to aliquot of liquid cell culture [Sample] and pulse-vortex [Machine 1] to mix, incubate in 56° C. water bath [Machine 2]

Task 2: centrifuge [Machine 3] to bring down condensation

Task 3: add ethanol [Reagent 2], pulse-vortex [Machine 1] to mix

Task 4: transfer solution to spin column (having silica membrane) in collection tube [Object 1]

Task 5: centrifuge [Machine 3] to bind DNA to column, pour off flow-through

Task 6: apply wash buffer 1 [Reagent 3] to column, centrifuge [Machine 3], pour off flow-through Task 7: apply wash buffer 2 [Reagent 4] to column, centrifuge [Machine 3]

Task 8: place spin column in new tube, add resuspension buffer [Reagent 5] to column, incubate at room temperature Task 9: centrifuge [Machine 3] to release DNA from column The captured process may comprise a tracked route at the first location comprising a series of waypoints and a plurality of recognized objects, each object corresponding to a waypoint:

| Waypoints on path of travel (coordinates) | Recognized Object |
|---|---|
| Waypoint A (X, Y, Z) | Reagent 1 |
| Waypoint B (X, Y, Z) | Sample |
| Waypoint C (X, Y, Z) | Machine 1 |
| Waypoint D (X, Y, Z) | Machine 2 |
| Waypoint E (X, Y, Z) | Machine 3 |
| Waypoint F (X, Y, Z) | Reagent 2 |
| Waypoint G (X, Y, Z) | Object 1 |
| Waypoint H (X, Y, Z) | Reagent 3 |
| Waypoint I (X, Y, Z) | Reagent 4 |
| Waypoint J (X, Y, Z) | Reagent 5 |

The resultant task-to-object-mapping (for the tasks performed with objects at the first location may be defined in a data structure as shown below:

| Workflow | Object |
|---|---|
| Task 1 | Reagent 1 |
|  | Sample |
|  | Machine 1 |
|  | Machine 2 |
| Task 2 | Machine 3 |
| Task 3 | Reagent 2 |
|  | Machine 1 |
| Task 4 | Object 1 |
| Task 5 | Machine 3 |
| Task 6 | Reagent 3 |
|  | Machine 3 |
| Task 7 | Reagent 4 |
|  | Machine 3 |
| Task 8 | Reagent 5 |
| Task 9 | Machine 3 |

The candidate objects identified at the second location (as determined from analysis of the scan data of the second location in block 110) comprises:

| Coordinates | Recognized Object |
|---|---|
| (X, Y, Z) | Reagent 1 |
| (X, Y, Z) | Sample |
| (X, Y, Z) | Machine 1 |
| (X, Y, Z) | Machine 4 |
| (X, Y, Z) | Machine 3 |
| (X, Y, Z) | Reagent 2 |
| (X, Y, Z) | Object 2 |
| (X, Y, Z) | Reagent 3 |
| (X, Y, Z) | Reagent 4 |
| (X, Y, Z) | Reagent 6 |

It will be noted that the second location is not equipped with a water bath [Machine 2], spin column in collection tube [Object 1], or Reagent 5, but it is equipped with a vacuum column [Object 2] attached to a vacuum manifold [Machine 4] and Reagent 6. Process comparison module 616 is configured to compare the objects identified in the second location and determine that the process performed in the first location cannot be performed without modification since certain equipment used in that process is lacking in the second location. The process comparison module 616 is configured to examine the non-spatial characteristics (e.g., functional capabilities) of the objects identified in the second location and generate a modified process and mapped workflow (e.g. at block 114) that achieves the same result as the process captured in the first location, using the objects in the second location. Rules for generating the modified process may be stored in templates in memory 618, or may be inputted by the user who first captured the process in the first location, as some example. Specifically, in this example, a modified process for extraction of DNA from bacteria using a vacuum protocol instead of a spin protocol is generated as a result of the process comparison by the process comparison module 616.

The modified process for bacteria DNA extraction performed using objects at second location, via vacuum protocol, includes the following tasks:

Task 1: add lysis buffer [Reagent 1] to aliquot of liquid cell culture [Sample] and pulse-vortex [Machine 1] to mix, incubate in 56° C. heat block [Machine 4]

Task 2: centrifuge [Machine 3] to bring down condensation

Task 3: add ethanol [Reagent 2], pulse-vortex [Machine 1] to mix

Task 4: transfer solution to a vacuum column (having a silica membrane) [Object 2] attached to a vacuum manifold [Machine 4]

Task 5: apply vacuum to remove flow-through

Task 6: apply wash buffer 1 [Reagent 3] to column (will vacuum through)

Task 7: apply wash buffer 2 [Reagent 4] to column (will vacuum through)

Task 8: place spin column in new tube, add sterile water [Reagent 6] to column, incubate at room temperature Task 9: centrifuge [Machine 3] to release DNA from column The mapping of these objects in the second location to the tasks (as determined in block 112) is:

| Workflow | Object |
|---|---|
| Task 1 | Reagent 1 |
|  | Sample |
|  | Machine 1 |
|  | Machine 4 |
| Task 2 | Machine 3 |
| Task 3 | Reagent 2 |
|  | Machine 1 |
| Task 4 | Machine 4 |
|  | Object 2 |
| Task 5 | Machine 4 |
| Task 6 | Reagent 3 |
|  | Machine 4 |
| Task 7 | Reagent 4 |
|  | Machine 4 |
| Task 8 | Reagent 6 |
| Task 9 | Machine 3 |

This results in a mapped workflow as follows:

| Workflow | Object | Waypoints on path of travel (coordinates) |
|---|---|---|
| Task 1 | Reagent 1 | Waypoint K (X, Y, Z) |
|  | Sample |  |
|  | Machine 1 |  |
|  | Machine 4 |  |
| Task 2 | Machine 3 | Waypoint L (X, Y, Z) |
| Task 3 | Reagent 2 | Waypoint M (X, Y, Z) |
|  | Machine 1 |  |
| Task 4 | Machine 4 | Waypoint N (X, Y, Z) |
|  | Object 2 |  |
| Task 5 | Machine 4 | Waypoint O (X, Y, Z) |
| Task 6 | Reagent 3 | Waypoint P (X, Y, Z) |
|  | Machine 4 | Waypoint Q (X, Y, Z) |
| Task 7 | Reagent 4 | Waypoint R (X, Y, Z) |
|  | Machine 4 |  |
| Task 8 | Reagent 6 | Waypoint S (X, Y, Z) |
| Task 9 | Machine 3 | Waypoint T (X, Y, Z) |

Further aspects are the invention are set out in the following examples. Aspects of these different examples may be combined in any way and in particular, the optional aspects of the first further example below may be combined in any combination with the first, second or third further examples below.

A first further example provides a computer-implemented method of generating a mixed reality workflow, the method comprising: identifying a series of tasks and generating an input task-to-object-mapping by analyzing data that defines a process performed by a first user interacting with objects in a first location, wherein the input task-to-object-mapping comprises, for each task in the series of tasks, a mapping of the task to an object used in the task; determining a task-specific non-spatial characteristic of each object in the input task-to-object-mapping; identifying a plurality of candidate objects in a second location, location data defining a position of each candidate object within the second location and a non-spatial characteristic of each candidate object by analyzing data received from the second location; generating an output task-to-object mapping by mapping each object in the input task-to-object-mapping to a candidate object using the task-specific non-spatial characteristic of each object in the input task-to-object-mapping and the non-spatial characteristic of each candidate object; generating a mapped workflow comprising a process path using the series of tasks, the location data and the output task-to-object-mapping; and outputting the mapped workflow to a device in the second location.

In the first further example, or any other example described herein, generating an output task-to-object mapping may comprise, for an object in the input task-to-object-mapping: comparing the task-specific non-spatial characteristic of the object to the non-spatial characteristic of candidate objects; and in response to identifying a candidate object with a corresponding non-spatial characteristic, replacing the object in the input task-to-object-mapping with the candidate object.

In the first further example, or any other example described herein, generating an output task-to-object mapping may further comprise, for an object in the input task-to-object-mapping: in response to identifying a plurality of candidate objects each with a corresponding non-spatial characteristic, selecting one of the plurality of candidate objects using pre-defined criteria and replacing the object in the input task-to-object-mapping with the selected candidate object.

In the first further example, or any other example described herein, the input task-to-object-mapping may comprise, for a task in the series of tasks, a mapping of the task to a primary object used in the task and to a corresponding subsidiary object used in the task and wherein mapping each object in the input task-to-object-mapping to a candidate object using the task-specific non-spatial characteristic of each object and the non-spatial characteristic of each candidate object comprises: for a primary object in the input task-to-object-mapping: comparing the task-specific non-spatial characteristic of the primary object to the non-spatial characteristic of each candidate object; and in response to identifying a candidate object with a corresponding non-spatial characteristic, replacing the primary object in the input task-to-object-mapping with the candidate object, for a corresponding subsidiary object in the input task-to-object-mapping: comparing the task-specific non-spatial characteristic of the second object to the non-spatial characteristic of each candidate object proximate to the candidate object that replaced to the primary object in the input task-to-object-mapping; and in response to identifying a proximate candidate object with a corresponding non-spatial characteristic, replacing the subsidiary object in the input task-to-object-mapping with the proximate candidate object.

In the first further example, or any other example described herein, the mapped workflow may be generated and output in real-time, the method further comprises, receiving status information from a candidate object (411) and the mapping of each object in the input task-to-object-mapping to a candidate object additionally uses the status information.

In the first further example, or any other example described herein, the data that defines a process may comprise video data recording the process performed by the first user in the first location, the data captured by a device in the first location. This device may be a mobile device, a fixed device or a HMD.

In the first further example, or any other example described herein, the mapped workflow output to the device in the second location may comprise a UI element showing a next step in the process path and a process prompt.

In the first further example, or any other example described herein, the mapped workflow output to the device in the second location may comprise a visual prompt generated using gesture data, the gesture data defining a gesture performed by the first user interacting with a first object in the first location relative to a position of the object in the first location, wherein the first object is mapped to a first candidate object and wherein the visual prompt is presented in the mapped workflow in a corresponding position relative to the first candidate object in the second location.

In the first further example, or any other example described herein, the visual prompt may comprise an animated avatar of the first user, the animated avatar animated to perform the gesture in a corresponding position relative to the first candidate object in the second location.

In the first further example, or any other example described herein, the mapping of each object in the input task-to-object-mapping to a candidate object may be performed independent of location data for the objects.

In the first further example, or any other example described herein, the task-specific non-spatial characteristic of an object is independent of a position of the object in the first location.

In the first further example, or any other example described herein, the task-specific non-spatial characteristic of an object comprises a capability of the object that is used to perform the task.

In the first further example, or any other example described herein, the task-specific non-spatial characteristic of the object may comprise an environmental constraint associated with the object and the task.

In the first further example, or any other example described herein, the method may further comprise receiving a request for the mixed reality workflow mapped to the second location and wherein the plurality of candidate objects in a second location are identified in response to receiving the request.

In the first further example, or any other example described herein, the method may further comprise: identifying a second series of tasks and generating a resultant task-to-object-mapping by analyzing data that defines actions of a second user interacting with objects in the second location, wherein the resultant task-to-object-mapping comprises, for each task in the second series of tasks, a mapping to an object used in the task; comparing the second series of tasks to the series of tasks performed by the first user and the output task-to-object-mapping to the resultant task-to-object-mapping to identify differences; and outputting the differences.

In the first further example, or any other example described herein, the device in the second location may be a mobile device.

In the first further example, or any other example described herein, the device in the second location may be a head-mounted display (HMD).

A second further example provides a system for generating a mixed reality workflow, the system comprising: a process analysis module configured to: identify a series of tasks and generate an input task-to-object-mapping by analyzing data that defines a process performed by a first user interacting with objects in a first location, wherein the input task-to-object-mapping comprises, for each task in the series of tasks, a mapping of the task to an object used in the task, and determine a task-specific non-spatial characteristic of each object in the input task-to-object-mapping; a process mapping module configured to: identify a plurality of candidate objects in a second location, location data defining a position of each candidate object within the second location and a non-spatial characteristic of each candidate object by analyzing data received from the second location, generate an output task-to-object mapping by mapping each object in the input task-to-object-mapping to a candidate object using the non-spatial characteristic of each object in the input task-to-object mapping and the non-spatial characteristic of each candidate object, and generate a mapped workflow comprising a process path using the series of tasks, the location data and the output task-to-object-mapping; and a communication interface configured to output the mapped workflow to a device in the second location.

In the second further example, or any other example described herein, the device may be a mobile device.

In the second further example, or any other example described herein, the device may be a HMD.

In the second further example, or any other example described herein, the system may further comprise the HMD or mobile device, wherein the HMD or mobile device is configured to display the mapped workflow and to perform a scan of the second location and output scan data to the processing mapping module and wherein the processing mapping module is configured to identify the plurality of candidate objects by analyzing the scan data.

In the second further example, or any other example described herein, the system may further comprise a HMD or mobile device in the first location, wherein the HMD or mobile device in the first location is configured to capture the process performed by the first user in the first location and output captured data to the process analysis module and wherein the process analysis module is configured to identify the series of tasks and generate the input task-to-object mapping by analyzing the captured data.

A third further example provides a computing system comprising: one or more processors; and computer storage memory having computer-executable instructions stored thereon which, when executed by the one or more processors, implement a method comprising: identifying a series of tasks and generating an input task-to-object-mapping by analyzing data that defines a process performed by a first user interacting with objects in a first location, wherein the input task-to-object-mapping comprises, for each task in the series of tasks, a mapping of the task to an object used in the task; determining a task-specific non-spatial characteristic of each object in the input task-to-object-mapping; identifying a plurality of candidate objects in a second location, location data defining a position of each candidate object within the second location and a non-spatial characteristic of each candidate object by analyzing data received from the second location; generating an output task-to-object mapping by mapping each object in the input task-to-object-mapping to a candidate object using the task-specific non-spatial characteristic of each object in the input task-to-object-mapping and the non-spatial characteristic of each candidate object; generating a mapped workflow comprising a process path using the series of tasks, the location data and the output task-to-object-mapping; and outputting the mapped workflow to a device in the second location.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method of generating a mixed reality workflow, the method comprising:
    identifying a series of tasks and generating an input task-to-object-mapping by analyzing data that defines a process performed by a first user interacting with objects in a first location, wherein the input task-to-object-mapping comprises, for each task in the series of tasks, a mapping of the task to an object used in the task;
    determining a task-specific non-spatial characteristic of each object in the input task-to-object-mapping;
    identifying a plurality of candidate objects in a second location, location data defining a position of each candidate object within the second location and a non-spatial characteristic of each candidate object by analyzing data received from the second location;
    generating an output task-to-object mapping by mapping each object in the input task-to-object-mapping to a candidate object using the task-specific non-spatial characteristic of each object in the input task-to-object-mapping and the non-spatial characteristic of each candidate object;
    generating a mapped workflow comprising a process path using the series of tasks, the location data, and the output task-to-object-mapping; and
    outputting the mapped workflow to a device in the second location, wherein
    the task-specific non-spatial characteristic of each object comprises a capability of a respective object that is used to perform a respective task, and
    the task-specific non-spatial characteristic of each object further comprises an environmental constraint associated with the respective object and the respective task.

2. The method according to claim 1, wherein generating an output task-to-object mapping comprises, for an object in the input task-to-object-mapping:
    comparing the task-specific non-spatial characteristic of the object to the non-spatial characteristic of candidate objects; and
    in response to identifying a candidate object with a corresponding non-spatial characteristic, replacing the object in the input task-to-object-mapping with the candidate object.

3. The method according to claim 2, wherein generating an output task-to-object mapping further comprises, for an object in the input task-to-object-mapping:
in response to identifying a plurality of candidate objects each with a corresponding non-spatial characteristic, selecting one of the plurality of candidate objects using pre-defined criteria and replacing the object in the input task-to-object-mapping with the selected candidate object.

4. The method according to claim 1, wherein the input task-to-object-mapping comprises, for a task in the series of tasks, a mapping of the task to a primary object used in the task and to a corresponding subsidiary object used in the task and wherein mapping each object in the input task-to-object-mapping to a candidate object using the task-specific non-spatial characteristic of each object and the non-spatial characteristic of each candidate object comprises:
for a primary object in the input task-to-object-mapping:
comparing the task-specific non-spatial characteristic of the primary object to the non-spatial characteristic of each candidate object; and
in response to identifying a candidate object with a corresponding non-spatial characteristic, replacing the primary object in the input task-to-object-mapping with the candidate object,
for a corresponding subsidiary object in the input task-to-object-mapping:
comparing the task-specific non-spatial characteristic of a second object to the non-spatial characteristic of each candidate object proximate to the candidate object that replaced to the primary object in the input task-to-object-mapping; and
in response to identifying a proximate candidate object with a corresponding non-spatial characteristic, replacing the subsidiary object in the input task-to-object-mapping with the proximate candidate object.

5. The method according to claim 1, wherein the mapped workflow is generated and output in real-time, the method further comprises, receiving status information from a candidate object and the mapping of each object in the input task-to-object-mapping to a candidate object additionally uses the status information.

6. The method according to claim 1, wherein the data that defines a process comprises video data recording the process performed by the first user in the first location, the data captured by a device in the first location.

7. The method according to claim 1, wherein the mapped workflow output to the device in the second location comprises a UI element showing a next step in the process path and a process prompt.

8. The method according to claim 1, wherein the mapped workflow output to the device in the second location comprises a visual prompt generated using gesture data, the gesture data defining a gesture performed by the first user interacting with a first object in the first location relative to a position of the object in the first location, wherein the first object is mapped to a first candidate object and wherein the visual prompt is presented in the mapped workflow in a corresponding position relative to the first candidate object in the second location.

9. The method according to claim 8, wherein the visual prompt comprises an animated avatar of the first user, the animated avatar animated to perform the gesture in a corresponding position relative to the first candidate object in the second location.

10. The method according to claim 1, wherein the mapping of each object in the input task-to-object-mapping to a candidate object is performed independent of location data for the objects.

11. The method according to claim 1, wherein the task-specific non-spatial characteristic of an object is independent of a position of the object in the first location.

12. The method according to claim 1, further comprising receiving a request for the mixed reality workflow mapped to the second location and wherein the plurality of candidate objects in a second location are identified in response to receiving the request.

13. The method of claim 1, further comprising:
identifying a second series of tasks and generating a resultant task-to-object-mapping by analyzing data that defines actions of a second user interacting with objects in the second location, wherein the resultant task-to-object-mapping comprises, for each task in the second series of tasks, a mapping to an object used in the task;
comparing the second series of tasks to the series of tasks performed by the first user and the output task-to-object-mapping to the resultant task-to-object-mapping to identify differences; and
outputting the differences.

14. The method of claim 1, wherein the device in the second location is a mobile device.

15. A system for generating a mixed reality workflow, the system comprising:
one or more processors configured to execute:
a process analysis module configured to:
identify a series of tasks and generate an input task-to-object-mapping by analyzing data that defines a process performed by a user interacting with objects in a first location, wherein the input task-to-object-mapping comprises, for each task in the series of tasks, a mapping of the task to an object used in the task, and
determine a task-specific non-spatial characteristic of each object in the input task-to-object-mapping;
a process mapping module configured to:
identify a plurality of candidate objects in a second location, location data defining a position of each candidate object within the second location and a non-spatial characteristic of each candidate object by analyzing data received from the second location,
generate an output task-to-object mapping by mapping each object in the input task-to-object-mapping to a candidate object using the non-spatial characteristic of each object in the input task-to-object mapping and the non-spatial characteristic of each candidate object, and
generate a mapped workflow comprising a process path using the series of tasks, the location data, and the output task-to-object-mapping; and
a communication interface configured to output the mapped workflow to a device in the second location, wherein
the task-specific non-spatial characteristic of each object comprises a capability of a respective object that is used to perform a respective task, and
the task-specific non-spatial characteristic of each object further comprises an environmental constraint associated with the respective object and the respective task.

16. The system according to claim 15, wherein the device is a head-mounted display (HMD) and the system further comprising the HMD, wherein the HMD is configured to display the mapped workflow and to perform a scan of the second location and output scan data to the processing mapping module and wherein the processing mapping module is configured to identify the plurality of candidate objects by analyzing the scan data.

17. The system according to claim 15, further comprising an HMD in the first location, wherein the HMD in the first location is configured to capture the process performed by the user in the first location and output captured data to the process analysis module and wherein the process analysis module is configured to identify the series of tasks and generate the input task-to-object mapping by analyzing the captured data.

18. A computing system comprising:
one or more processors; and
computer storage memory having computer-executable instructions stored thereon which, when executed by the one or more processors, implement a method comprising:
identifying a series of tasks and generating an input task-to-object-mapping by analyzing data that defines a process performed by a user interacting with objects in a first location, wherein the input task-to-object-mapping comprises, for each task in the series of tasks, a mapping of the task to an object used in the task;
determining a task-specific non-spatial characteristic of each object in the input task-to-object-mapping;
identifying a plurality of candidate objects in a second location, location data defining a position of each candidate object within the second location and a non-spatial characteristic of each candidate object by analyzing data received from the second location;
generating an output task-to-object mapping by mapping each object in the input task-to-object-mapping to a candidate object using the task-specific non-spatial characteristic of each object in the input task-to-object-mapping and the non-spatial characteristic of each candidate object;
generating a mapped workflow comprising a process path using the series of tasks, the location data, and the output task-to-object-mapping; and
outputting the mapped workflow to a device in the second location, wherein
the task-specific non-spatial characteristic of each object comprises a capability of a respective object that is used to perform a respective task, and
the task-specific non-spatial characteristic of each object further comprises an environmental constraint associated with the respective object and the respective task.

* * * * *